(12) United States Patent
Arunachalam et al.

(10) Patent No.: US 10,178,514 B2
(45) Date of Patent: Jan. 8, 2019

(54) METHOD AND APPARATUS ENABLING LIVE TROUBLESHOOTING OF DEVICES IN ENERGY DISTRIBUTION INDUSTRY OR OTHER INDUSTRY USING MOBILE DEVICES

(71) Applicant: Honeywell International Inc., Morris Plains, NJ (US)

(72) Inventors: Soundari Arunachalam, Bangalore (IN); Ramesh Jalgama, Hyderabad (IN); Chandrasekar Reddy Mudireddy, Hyderabad (IN); Sharath Arramraju, Hyderabad (IN)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 15/615,651

(22) Filed: Jun. 6, 2017

(65) Prior Publication Data

US 2017/0366948 A1    Dec. 21, 2017

Related U.S. Application Data

(60) Provisional application No. 62/350,605, filed on Jun. 15, 2016.

(51) Int. Cl.
*H04W 4/00* (2018.01)
*H04W 4/12* (2009.01)
(Continued)

(52) U.S. Cl.
CPC ............. *H04W 4/12* (2013.01); *G06Q 50/06* (2013.01); *H04W 4/70* (2018.02); *H04W 4/80* (2018.02)

(58) Field of Classification Search
CPC ........... H04W 4/12; H04W 4/70; H04W 4/80; G06Q 50/06
(Continued)

(56) References Cited

U.S. PATENT DOCUMENTS

| 2011/0038301 | A1* | 2/2011 | Park | H04B 7/2606 370/315 |
| 2012/0191625 | A1 | 7/2012 | Arndt et al. | |

(Continued)

FOREIGN PATENT DOCUMENTS

| KR | 20070076332 A | 7/2007 |
| KR | 20120004213 A | 1/2012 |
| KR | 20140126461 A | 10/2014 |

OTHER PUBLICATIONS

"Suite SQL—Installation and Technical Reference Manual", Honeywell Process Solutions, Release 1, MNL-SQL-1, Oct. 2010, 64 pages.
(Continued)

*Primary Examiner* — Marcos Batista

(57) ABSTRACT

A method includes initiating a chat session between a first user of a mobile device in proximity to a field device and a second user remote from the field device. The method further includes receiving, at the mobile device via the chat session, one or more commands for the field device from a computing device used by the second user. The method additionally includes sending, from the mobile device to the field device, the one or more commands for execution by the field device. The method also includes receiving, at the mobile device, information from the field device and sending, from the mobile device to the computing device via the chat session, the information.

16 Claims, 8 Drawing Sheets

(51) Int. Cl.
  *G06Q 50/06* (2012.01)
  *H04W 4/70* (2018.01)
  *H04W 4/80* (2018.01)
(58) Field of Classification Search
  USPC .......................................... 455/466; 370/338
  See application file for complete search history.

(56) References Cited

U.S. PATENT DOCUMENTS

| | | | | |
|---|---|---|---|---|
| 2013/0093589 A1* | 4/2013 | Hsiao | ....................... | G08B 1/08 |
| | | | | 340/539.13 |
| 2014/0108149 A1* | 4/2014 | Jabara | ................. | G07F 17/3218 |
| | | | | 705/14.64 |
| 2014/0179222 A1 | 6/2014 | Chaudhary et al. | | |

OTHER PUBLICATIONS

Foreign Communication from Related Counterpart Application; PCT Application No. PCT/US2017/036675; International Search Report and Written Opinion of the International Searching Authority dated Sep. 20, 2017; 12 pages.

* cited by examiner

METHOD AND APPARATUS ENABLING LIVE TROUBLESHOOTING OF DEVICES IN ENERGY DISTRIBUTION INDUSTRY OR OTHER INDUSTRY USING MOBILE DEVICES

CROSS-REFERENCE TO RELATED APPLICATION AND PRIORITY CLAIM

This application claims priority under 35 U.S.C. § 119(e) to U.S. Provisional Patent Application No. 62/350,605 filed on Jun. 15, 2016, which is hereby incorporated by reference in its entirety.

TECHNICAL FIELD

This disclosure relates generally to the use of mobile devices. More specifically, this disclosure relates to a method and apparatus for enabling live troubleshooting of devices in an energy distribution industry or other industry using mobile devices.

BACKGROUND

Energy distribution utilities (such as electric, gas, or water companies) often have multiple metering devices distributed over a large area. Some sites at which metering devices are located may be difficult to reach by personnel. A technician may need to go examine a metering device in order to repair, verify the operation of, or otherwise service the metering device. However, once at the metering device, a technical assistance team back in an office may be unable to provide guidance to the technician. In some utilities, the average waiting period for a technician to receive guidance from a technical assistance team could be between three and twenty-four hours. By the time a member of the technical assistance team contacts the technician, the technician may have already left a site. This may then require the same technician or another technician to visit the same site again, resulting in wasted effort and associated expenses. Moreover, if a metering device cannot be fixed after the initial visit, this could lead to a loss of data or a billing dispute with a customer.

SUMMARY

This disclosure provides a method and apparatus enabling live troubleshooting of devices in an energy distribution industry or other industry using mobile devices.

In a first embodiment, a method includes initiating a chat session between a first user of a mobile device in proximity to a field device and a second user remote from the field device. The method further includes receiving, at the mobile device via the chat session, one or more commands for the field device from a computing device used by the second user. The method additionally includes sending, from the mobile device to the field device, the one or more commands for execution by the field device. The method also includes receiving, at the mobile device, information from the field device and sending, from the mobile device to the computing device via the chat session, the information.

In a second embodiment, a mobile device includes a communication unit configured to communicate with a field device when the mobile device is proximate to the field device. The mobile device further includes at least one processing device configured to initiate a chat session between a first user of the mobile device and a second user remote from the field device. The processing device is further configured to receive, via the chat session, one or more commands for the field device from a computing device used by the second user. The processing device is also configured to initiate transmission of the one or more commands to the field device for execution by the field device. The processing device is additionally configured to receive information from the field device indicating the results of the commands and to initiate transmission of the information to the computing device via the chat session of the information indicating the results of the commands.

In a third embodiment, a method includes receiving a request to create a chat session between a first user of a mobile device in proximity to a field device and a second user remote from the field device. The method further includes sending, from a computing device used by the second user via the chat session, one or more messages from the second user to the mobile device. The method also includes sending, from the computing device via the chat session, one or more commands for the field device to the mobile device. The method additionally includes receiving, at the computing device via the chat session, information from the field device.

In a fourth embodiment, an apparatus comprises at least one processing device configured to receive a request to create a chat session between a first user of a mobile device in proximity to a field device and a second user remote from the field device. The processing device is further configured to initiate transmission of one or more messages from the second user to the mobile device via the chat session. The processing device is also configured to initiate transmission of one or more commands for the field device to the mobile device via the chat session. The processing device is additionally configured to receive information from the field device via the chat session.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 11, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
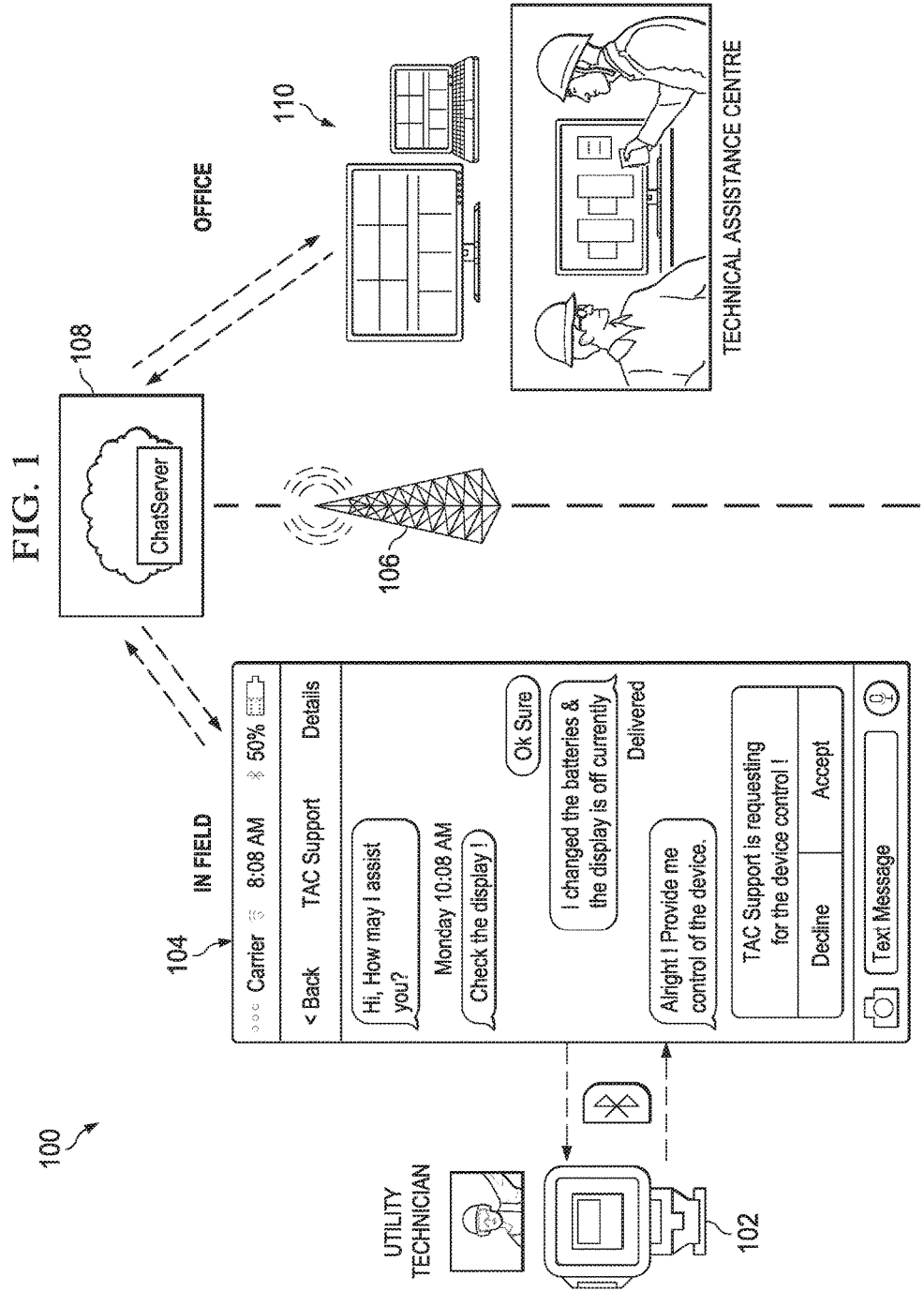
FIG. 1 illustrates an example system supporting live troubleshooting of devices in an energy distribution industry or other industry using mobile devices according to this disclosure.

FIG. 1 illustrates an example system 100 supporting live troubleshooting of devices in an energy distribution industry or other industry using mobile devices according to this disclosure. As shown in FIG. 1, the system 100 includes or is used in conjunction with one or more field devices 102. The field devices 102 denote any suitable equipment with which a technician or other personnel needs to interact and possibly configure, diagnose, or repair. In some embodiments, the field devices 102 denote metering devices associated with an electric, gas, water, or other utility company. The system 100 could include any number of field devices 102 distributed in any suitable geographic area(s).

Each of multiple users (such as field technicians) uses or has access to a mobile device 104. Each mobile device 104 denotes a portable device that can interact with both a user and one or more field devices 102. In some embodiments, the mobile devices 104 denote smartphones (such as APPLE IPHONE or ANDROID devices) or tablet computers (such as APPLE IPAD or ANDROID devices). However, any other suitable mobile devices could be used in the system 100.

The mobile devices 104 communicate via at least one wireless network 106. The wireless network 106 could denote any suitable network or combination of networks that can transport data (possibly including voice data) to and from the mobile devices 104. For example, the wireless network 106 could include a cellular network or a local WiFi network.

At least one chat server 108 is accessible to the mobile devices 104 via the wireless network(s) 106. Each chat server 108 supports chat- or message-based interactions between the mobile devices 104 and computing devices 110 used by members of a technical assistance center (TAC) or other personnel. Each chat server 108 includes any suitable computing device supporting chat- or message-based interactions. Each computing device 110 denotes any suitable desktop, laptop, tablet, or other computing device.

As described above, technicians and other personnel who are located at specific sites may have difficulty contacting personnel of a technical assistance center, who are often in an office building or other location remote from the technicians. In some cases, TAC members may be unable to diagnose issues remotely based on the technician's description of the situation, or the technician may not have access to information about a field device 102 that the TAC members need. In other cases, all TAC personnel may be busy, and the technician may only be able to leave a message and wait for a TAC member to return their call. In yet other cases, there may be a miscommunication between the TAC member and the technician that results in the TAC member giving the wrong instructions or the technician failing to properly implement instructions. Because of this, a technician may have to leave a site without receiving assistance in resolving an issue, which results in wasted time and effort or other problems.

In accordance with this disclosure, each mobile device 104 can include a mobile application or "app" that supports an online chat feature for a technician or other personnel. The mobile app allows a user to use his or her mobile device 104 to contact someone in the TAC or other location. The mobile app also provides an ability to connect to and communicate with one or more field devices 102, such as via a short range communication technique. In this document, the phrase "short range communication technique" refers to any communication technique designed to facilitate communications involving devices in close proximity to one another, such as Near Field Communications (NFC), BLUETOOTH LOW ENERGY (BLE), or infrared (IR) communications. For simplicity, NFC is used in the examples of this disclosure, but it is understood that any suitable technique such as BLE or IR communications could be used. A technician could therefore contact a TAC member any time while in the field by starting a chat session for troubleshooting assistance. A TAC member can provide live help to the technician through chat messages. The TAC member could also request control of a field device 102 via the chat session. If the technician accepts the request for control, the TAC member could send commands and receive responses or other information from the field device 102 through the chat session.

Among other things, technicians or other personnel in the field can receive technical assistance in a more timely manner. There is therefore less chance that the technicians or other personnel in the field will fail to receive assistance or leave sites before assistance is received. Also, by enabling remote interaction with the field devices 102, TAC members could interact with the field devices 102 as if the TAC members were present in the field themselves.

Depending on the implementation, this approach could provide various benefits. For example, remote control of a field device 102 that is otherwise not remotely accessible can be provided via a live chat session on the user's mobile device 104 (which is also connected to the field device 102). This could allow collaborative troubleshooting in which a technician and a TAC member can together fix a field device 102 by alternatively taking control of the field device 102. Also, a TAC member can issue commands to a field device 102 for effective troubleshooting without exposing the same to the technician. Further, the TAC member's computing device 110 (or a server or other computing device with which the computing device 110 interacts) could support the auto-proposal of corrective steps based on information like keywords typed by the technician, such as by using a self-learning algorithm. In addition, the user's mobile device 104 could support live video streaming while troubleshooting by a technician.

In this way, end users like technicians could see significant reductions in the normal support cycle time (possibly to zero or near-zero wait times), resulting in significant savings. This can help to improve the chances of or even guarantee resolution of a device problem before a technician leaves a site. This can further reduce operating expenses of a utility or other company by eliminating unnecessary or repetitive truck rolls, such as truck rolls to the same site to fix the same problem. In addition, chat information can be saved (either on a mobile device or a remote location) as a template for further reuse or for auditing purposes.

For an operator of a TAC (which could be a separate entity than the entity that owns or services the field devices 102), the TAC operator could use this type of system to implement a "pay per use" service model for remote TAC assistance. Also, messages and other data sent via the live chat feature can be collected, saved, and used for various purposes. Example purposes could include building a repository of diagnostic information for use in preventive maintenance operations or TAC personnel training. In addition, if the operator of the TAC also sells the field device 102 being serviced, this could help improve customer satisfaction for support, which may be converted into additional orders for more field devices 102.

Although FIG. 1 illustrates one example of a system 100 supporting live troubleshooting of devices in an energy distribution industry or other industry using mobile devices, various changes may be made to FIG. 1. For example, the system 100 could include any number of field devices 102, mobile devices 104, wireless networks 106, chat servers 108, or computing devices 110. Also, FIG. 1 does not limit this disclosure to any particular configuration or operational environment. In general, the techniques described in this patent document can be used in any suitable system.

Figure 2:
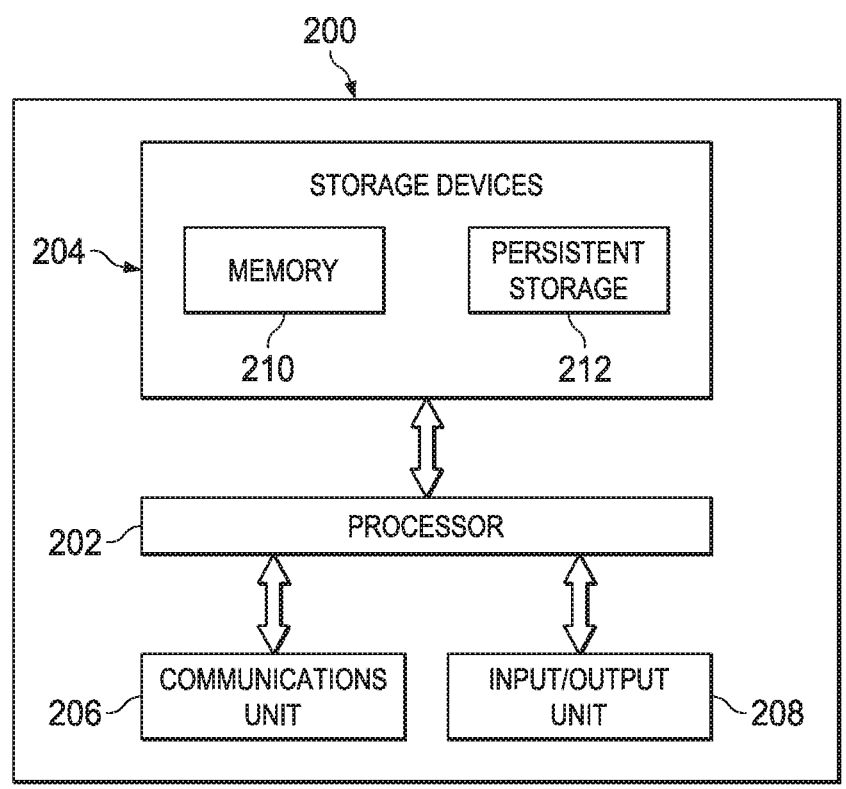
FIG. 2 illustrates an example computing device supporting live troubleshooting of devices in an energy distribution industry or other industry according to this disclosure.

FIG. 2 illustrates an example computing device 200 supporting live troubleshooting of devices in an energy distribution industry or other industry according to this disclosure. For example, the computing device 200 could denote any of the chat servers 108 or computing devices 110 shown in FIG. 1 and described above.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include at least one network interface card or wireless transceiver facilitating communications over at least one wired or wireless network. The communications unit 206 may support communications through any suitable physical or wireless communication link(s). In some embodiments, the communications unit 206 supports communications over a wireless network 106.

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Figure 3:
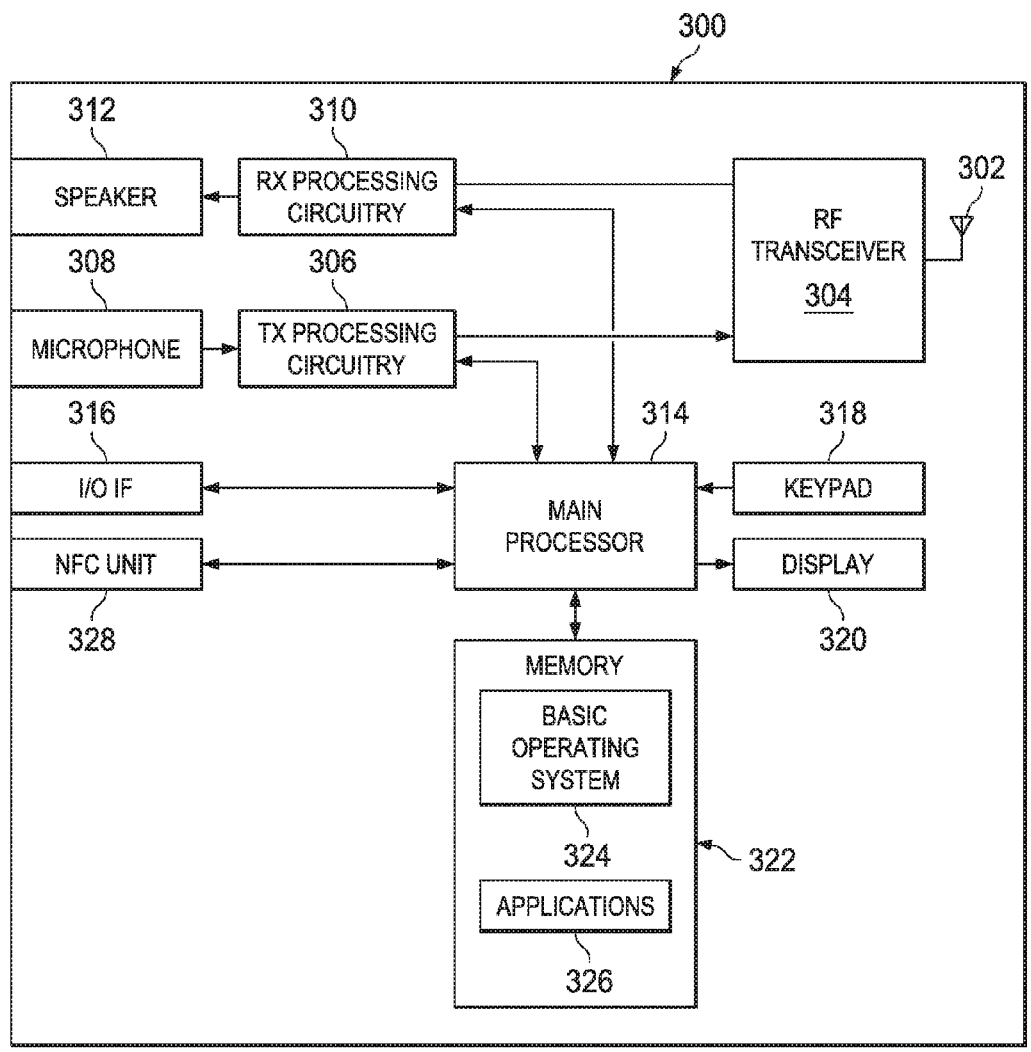
FIG. 3 illustrates an example mobile device supporting live troubleshooting of devices in an energy distribution industry or other industry according to this disclosure.

FIG. 3 illustrates an example mobile device 300 supporting live troubleshooting of devices in an energy distribution industry or other industry according to this disclosure. For example, the mobile device 300 could denote the mobile device 104 shown in FIG. 1 and described above.

As shown in FIG. 3, the mobile device 300 includes an antenna 302, a radio frequency (RF) transceiver 304, transmit (TX) processing circuitry 306, a microphone 308, and receive (RX) processing circuitry 310. The mobile device 300 also includes a speaker 312, a main processor 314, an input/output (I/O) interface (IF) 316, a keypad 318, a display 320, and a memory 322. The memory 322 includes a basic operating system (OS) program 324 and one or more applications 326. In addition, the mobile device 300 includes an NFC unit 328.

The RF transceiver 304 receives, from the antenna 302, an incoming RF signal, such as a cellular or WiFi signal from wireless network 106. The RF transceiver 304 down-converts the incoming RF signal to generate an intermediate frequency (IF) or baseband signal. The IF or baseband signal is sent to the RX processing circuitry 310, which generates a processed baseband signal by filtering, decoding, and/or digitizing the baseband or IF signal. The RX processing circuitry 310 transmits the processed baseband signal to the speaker 312 (such as for voice data) or to the main processor 314 for further processing (such as for chat data).

The TX processing circuitry 306 receives analog or digital voice data from the microphone 308 or other outgoing baseband data (such as chat data) from the main processor 314. The TX processing circuitry 306 encodes, multiplexes, and/or digitizes the outgoing baseband data to generate a processed baseband or IF signal. The RF transceiver 304 receives the outgoing processed baseband or IF signal from the TX processing circuitry 306 and up-converts the baseband or IF signal to an RF signal that is transmitted via the antenna 302, for example over wireless network 106.

The main processor 314 can include one or more processors or other processing devices and execute the basic OS program 324 stored in the memory 322 in order to control the overall operation of the mobile device 300. For example, the main processor 314 could control the reception of forward channel signals and the transmission of reverse channel signals by the RF transceiver 304, the RX processing circuitry 310, and the TX processing circuitry 306 in accordance with well-known principles. In some embodiments, the main processor 314 includes at least one microprocessor or microcontroller.

The main processor 314 is also capable of executing other processes and applications 326 resident in the memory 322. The main processor 314 can move data into or out of the memory 322 as required by an executing application 326. For example, an application 326 could be an application that facilitates communication between the mobile device 300 and a computing device 110 of a TAC member. The main processor 314 is also coupled to the I/O interface 316, which provides the mobile device 300 with the ability to connect to other devices such as laptop computers and handheld computers. The I/O interface 316 is the communication path between these accessories and the main processor 314.

The main processor 314 is also coupled to the keypad 318 and the display unit 355. The operator of the mobile device 300 can use the keypad 318 to enter data into the mobile device 300. The display 320 may be a liquid crystal display or other display capable of rendering text and/or at least limited graphics, such as from web sites. Note that if the display 320 denotes a touch screen capable of receiving input, fewer or not buttons or keypads may be needed.

The memory 322 is coupled to the main processor 314. Part of the memory 322 could include a random access memory (RAM), and another part of the memory 322 could include a Flash memory or other read-only memory (ROM).

The NFC unit 328 facilitates interactions between the mobile device 300 and other nearby devices, such as the field devices 102. The NFC unit 328 supports any suitable near-field communication technique or other short-range communication technique. In some embodiments, the NFC unit 328 supports BLE.

Although FIGS. 2 and 3 illustrates examples of computing and mobile devices, various changes may be made to FIGS. 2 and 3. For example, various components in each figure could be combined, further subdivided, or omitted and additional components could be added according to particular needs. As a particular example, each processor 202 or 340 could be divided into multiple processors, such as one or more central processing units (CPUs) and one or more graphics processing units (GPUs). Also, computing and mobile devices come in a wide variety of configurations, and FIGS. 2 and 3 do not limit this disclosure to any particular computing device or mobile device.

Figure 4:
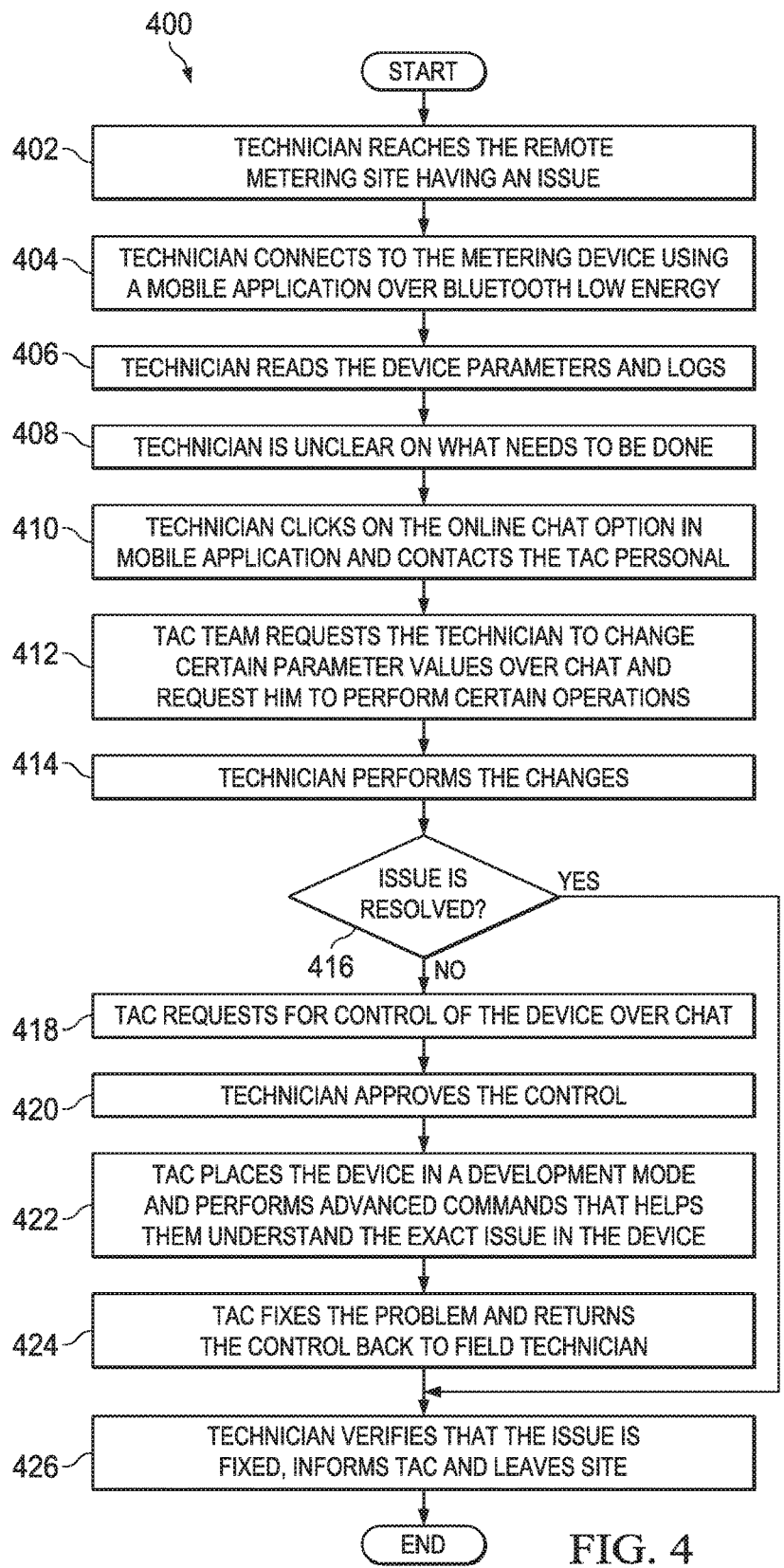
FIG. 4 illustrates an example method supporting live troubleshooting of devices in an energy distribution industry or other industry using mobile devices according to this disclosure.

FIG. 4 illustrates an example method 400 supporting live troubleshooting of devices in an energy distribution industry or other industry using mobile devices according to this disclosure. Note that the use case shown in FIG. 4 is for illustration only. The techniques and devices described in this patent document could find use in a wide variety of situations. For example, the techniques and devices described in this patent document could be used with a field device 102 other than utility metering. As another example, a mobile device 104 could be carried to a field device 102 so that the field device 102 can be accessed remotely (such as from a computing device 110) without the mobile device's user first attempting to resolve an issue with the field device 102.

At step 402, a field technician arrives at a remote site where a field device 102 is having an issue. In this embodiment, the field device 102 is a metering device, but it is understood that the method 400 may be used with any type of field device 102. For example, the field device 102 may have automatically reported an issue, or a routine remote check of the field device 102's status may have identified an issue.

At step 404, the field technician connects a mobile device 104 to the field device 102. This may be done using a BLE connection (an embodiment of wireless connection 106), or any other suitable connection such as another Near Field Communication protocol or a wired connection. In some embodiments, the mobile device 104 may automatically connect to the field device 102 when the mobile device 104 comes within proximity of the field device 102. In other embodiments, the mobile device 104 and the field device 102 go through a pairing process in order to connect.

Figure 5B:
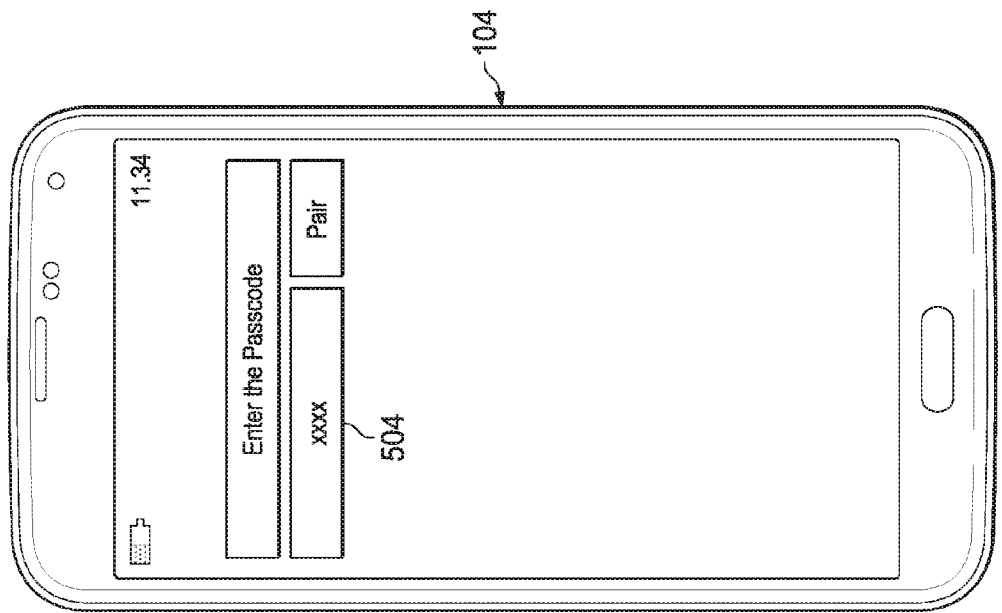
FIG. 5B illustrates an interface for entering a confirmation code to complete the process of pairing a field device and a mobile device.
Figure 5A:
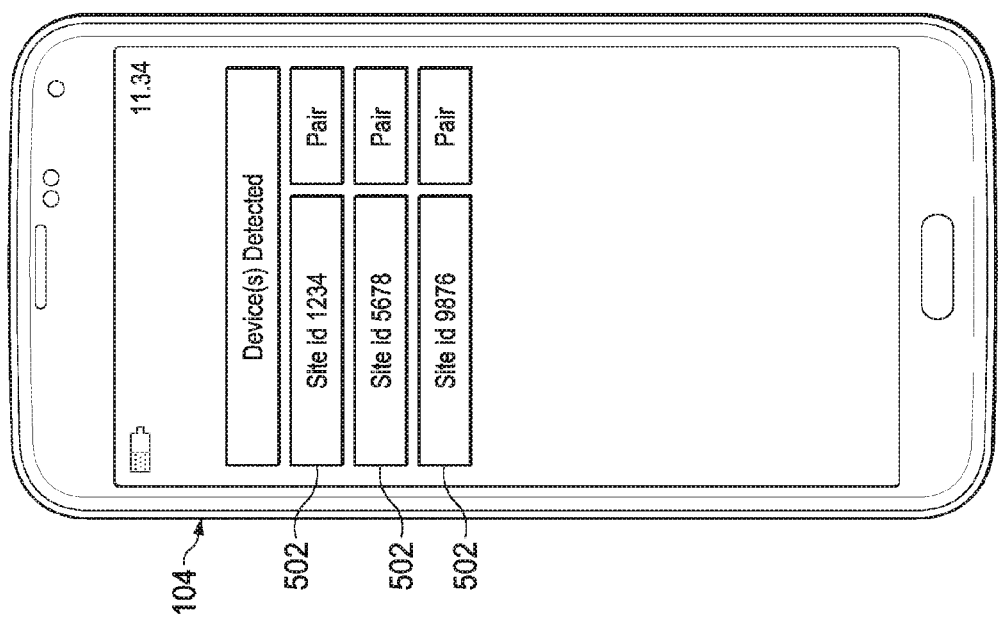
FIG. 5A illustrates an interface for selecting between one or more listings for one or more detected field devices.

For example, referring to FIGS. 5A and 5B, an interface of an application on the mobile device 104 is illustrated. FIG. 5A illustrates an interface for selecting between one or more listings 502 for one or more detected field devices 102. In some embodiments, after selecting one of the listings 502 (for example by pressing "Pair" next to the listing 502), the field device 102 is paired with the mobile device 104. In other embodiments, after selecting one of the listings 502, the interface of FIG. 5B may be displayed to facilitate pairing. FIG. 5B illustrates an interface for entering a confirmation code 504 to complete the process of pairing the field device 102 and the mobile device 104. The confirmation code 504 may be generated by the field device 102, and the technician may need to read the confirmation code 504 off of a display on the field device 102 in order to input it into the interface on the mobile device 104.

Returning to FIG. 4, at step 406, the field technician reads device parameters and logs of the field device 102 via the mobile device 104. For example, the field device 102 may provide the device parameters and logs to the application running on the mobile device 104 via the BLE connection.

Figure 6:
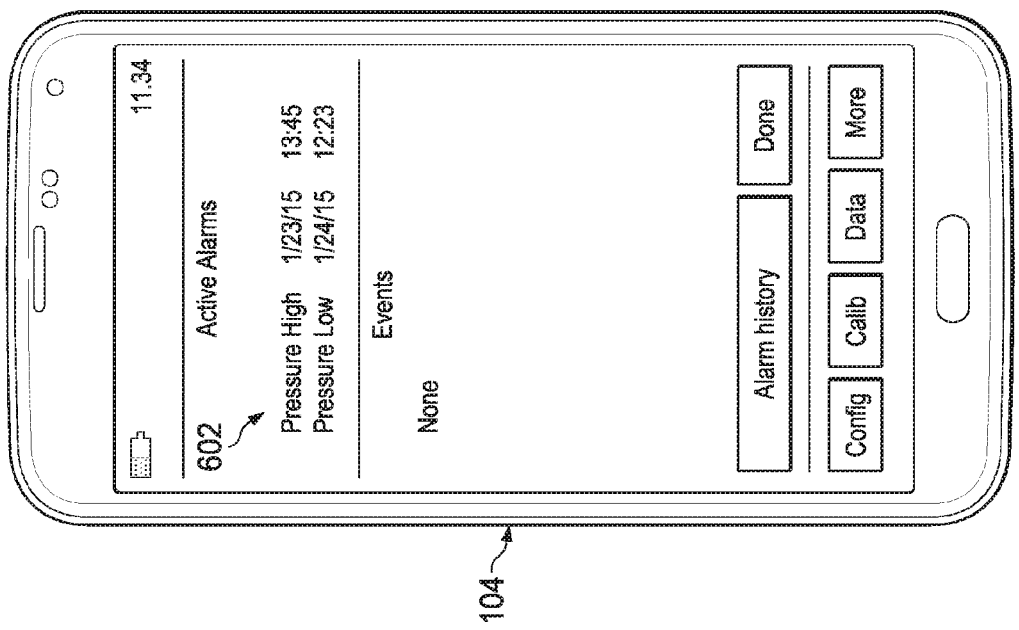
FIG. 6 illustrates an interface of an application on a mobile device that displays logs of events, alarms, or the like that have occurred within a field device and have been recorded by the field device.

For example, referring now to FIG. 6, an illustrated interface of an application on the mobile device 104 displays logs 602 of events, alarms, or the like that have occurred within the field device 102 and have been recorded by the field device 102. The logs 602 may provide the field technician with information about issues with the field device 102. As will be further described below, the logs 602 may also be used to provide this information to a TAC member.

Figure 7:
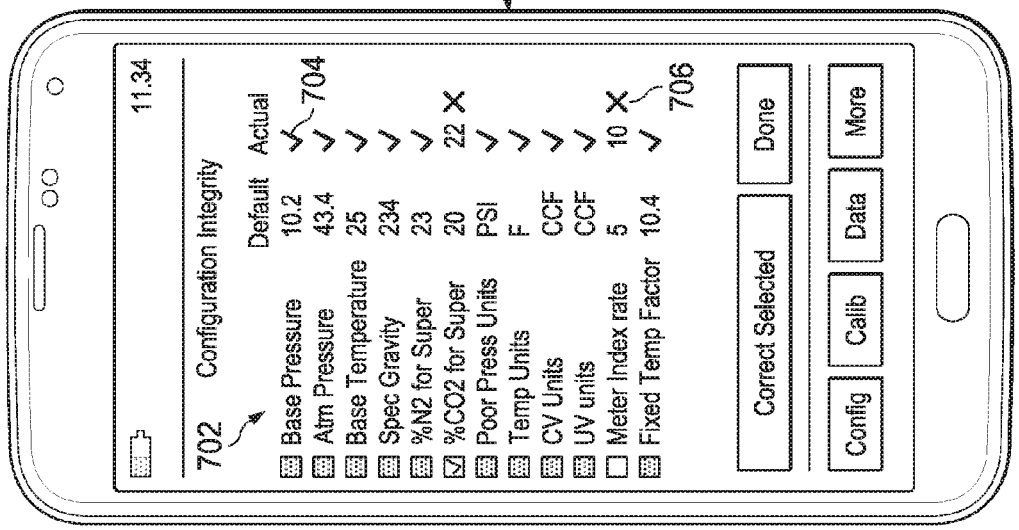
FIG. 7 illustrates an interface of an application on a mobile device that displays device parameters of the field device.

In another example, referring now to FIG. 7, an illustrated interface of an application on the mobile device 104 displays device parameters 702 of the field device 102. In this example, the device parameters 702 comprise a list of configuration settings for the field device 102 as well as a display of the current state of the parameter within the field device 102. For example, a base pressure configuration parameter of the field device 102 may be set to 10.2, and the interface displays an affirmative icon 704 (e.g., a check mark) indicating that the base pressure parameter is currently actually set to 10.2. In some embodiments, this affirmative icon 704 may be displayed when the base pressure parameter (or any other parameter) is within a predefined acceptable range of the default setting. In another example, the meter index rate may be set to 5, and the interface displays a warning icon 706 indicating that the actual parameter is different from the default setting (or is out of an acceptable range of the default setting). Furthermore, the interface may include a listing of the actual current value of the parameter, which is 10 in this example. The device parameters 702 may provide the field technician with details useful to diagnose the issues displayed in the logs 602. As will be further described below, the device parameters 702 may also be used to provide this information to a TAC member to assist in diagnosing the issues.

Figure 8:
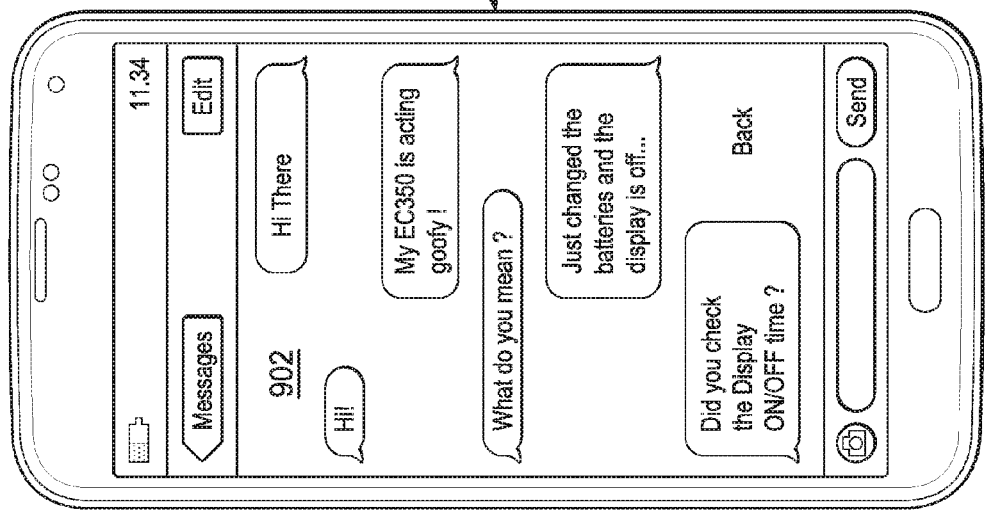
FIG. 8 illustrates an interface of an application on a mobile device that displays live data of the field device.

Referring now to FIG. 8, in yet another example, an illustrated interface of an application on mobile device 104 displays live data 802 of the field device 102, which may be live data related to device parameters 702. In some embodiments, the live data 802 may include a graph 804 or other representation of the recent history of the device parameters included in the live data 802. The live data 802 may provide the field technician with further details useful to diagnose the issues displayed in the logs 602. As will be further described below, the live data 802 may also be used to provide this information to a TAC member to assist in diagnosing the issues.

Returning to FIG. 4, at step 408, the field technician determines that he is unable to diagnose the issue or issues in the field device 102 without further information or assistance. For example, the field technician may decide that he needs information on the field device 102 that he does not have access to, and may determine that a TAC member could provide assistance to diagnose the issue.

Figure 9:
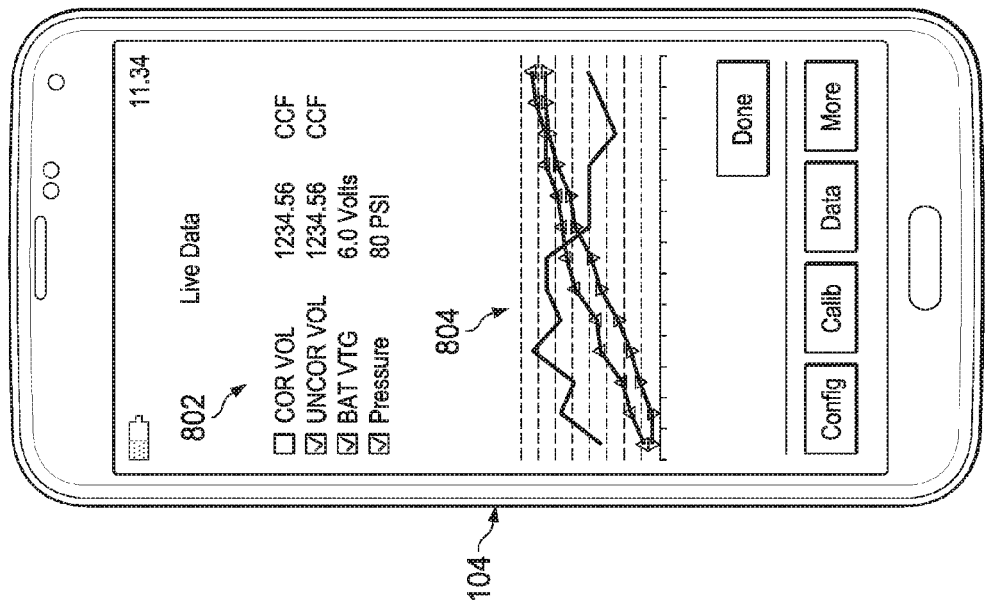
FIG. 9 illustrates an interface of an application on a mobile device that displays a chat session.

At step 410, the field technician activates a chat feature in the mobile application running on the mobile device 104 in order to initiate a chat session with a TAC member. This chat session may be in the form of a text message exchange, as illustrated in FIG. 9. In other embodiments, the chat session may include a video call, a combination of text messaging and voice call, or the like.

Figure 10:
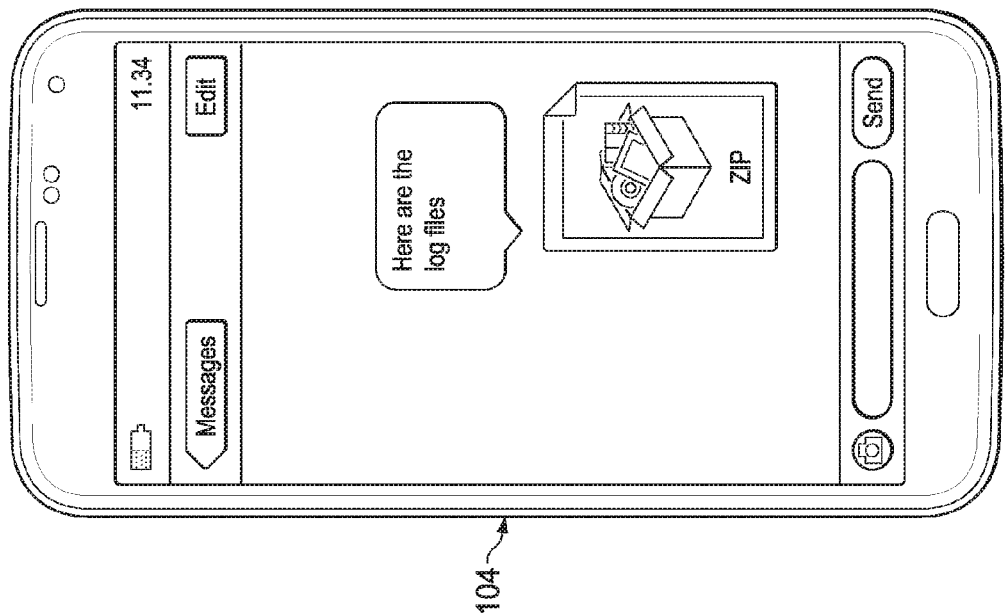
FIG. 10 illustrates an interface of an application on a mobile device that displays a file request and transfer.

At step 412, the TAC member may request information about the field device 102 from the field technician via the chat session. For example, the TAC member requests that the field technician explain the apparent issue and the state of the field device 102 via text message or voice call, as illustrated in the text message exchange 902 of FIG. 9. In some embodiments, as illustrated in FIG. 10, the TAC member requests, and the field technician transmits to the TAC member, copies of log files, device parameter files, live data history, or the like. Based on this information, the TAC member determines a course of action (e.g., a change in device parameter settings). The TAC member then instructs the field technician, via the chat session, to take the determined course of action (e.g., to change the device parameter settings).

Returning now to FIG. 4, at step 414, the field technician attempts to take the course of action recommended by the TAC member in step 412. For example, the field technician modifies the default device parameter settings for one or more parameters. In some embodiments, the field technician may fail to properly follow the instructions of the TAC member.

At step 416, the field technician determines whether the issue has been resolved by the actions taken at step 414. If the issue is resolved, the method 400 progresses to step 426, which is described further below. If the issue is not resolved, the field technician informs the TAC member that the issue was not resolved and the method 400 proceeds to step 418.

Figure 11:
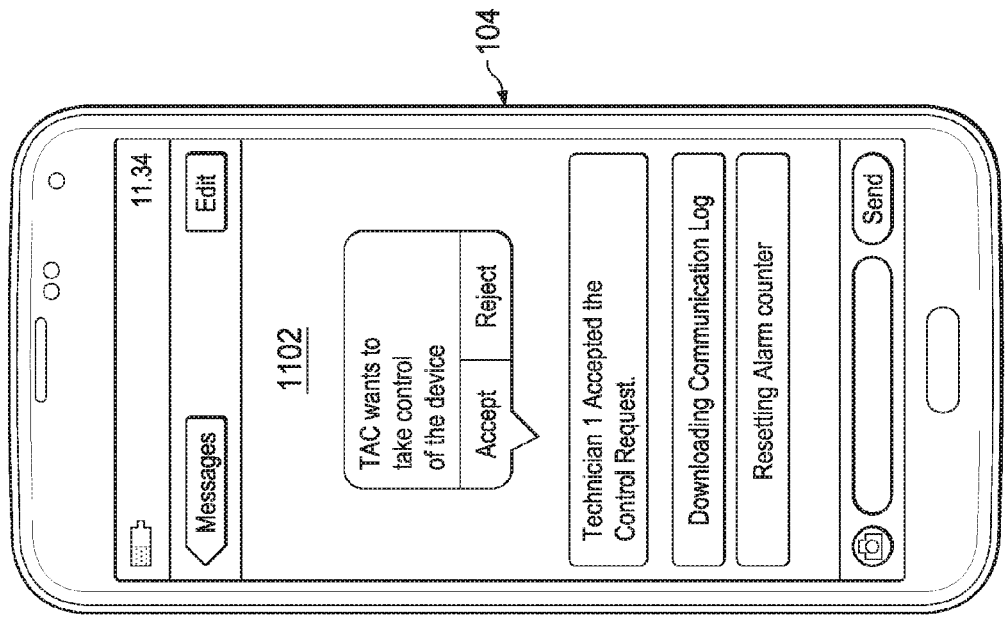
FIG. 11 illustrates an interface of an application on a mobile device that displays a dialog box indicating to a field technician that a TAC member has requested control of a field device.

At step 418, the TAC member requests control of the field device 102 via the chat session. Referring now to FIG. 11, an illustrated interface of an application on the mobile device 104 displays a dialog box 1102 indicating to the field technician that the TAC member has requested control of the field device 102. As illustrated, the dialog box 1102 may be presented within the interface of the chat session. In other embodiments, the dialog box 1102 could be a pop up dialog, a system notification dialog, or any other appropriate notification.

Returning to FIG. 4, at step 420, the field technician receives the TAC member's request and authorizes the TAC member to take control of the field device 102 via the mobile device 104. For example, according to FIG. 11, the field technician may tap or click an "Accept" option on the dialog box 1102. In other embodiments, the TAC member is able to directly take control of the field device 102 via the mobile device 104 without any action by the field technician.

At step 422, the TAC member accesses advanced commands within the field device 102, for example by placing the field device 102 in a development mode to access debugging commands or the like. The TAC member may additionally be able to directly access the device information displayed in FIGS. 6-8 after control of the field device 102 has been established. In this way, the TAC member may gain additional information that allows him to diagnose the issue. For example, if the field technician was mistaken and gave the TAC member incorrect information, or if the field technician left out information altogether, the TAC member would be able to directly access the information in order to make a diagnosis. The TAC member may also be able to discover that the actions taken by the field technician in step 414 (e.g., modifying default device parameter settings) were incomplete or incorrect.

At step 424, the TAC member takes actions to correct the issues in field device 102. For example, the TAC member issues commands to the field device 102 to modify the default settings of device parameters. In some embodiments, the TAC member receives information from the field device 102 indicating whether the issue is fixed. For example, the field device 102 may provide the live status of parameters of the field device 102 that indicate to the TAC member whether the parameters are within an acceptable range, which allows the TAC member to determine whether the issue is fixed. When the issue is fixed, the TAC member releases control of the field device 102.

At step 426, the field technician manually verifies that the issue is corrected and the field device 102 is functioning properly. The technician then informs the TAC member that the issue is corrected, and leaves the field site.

Although FIG. 4 illustrates one example of a method 400 supporting live troubleshooting of devices in an energy distribution industry or other industry, various changes may be made to FIG. 4. For example, while shown as a series of steps, various steps shown in FIG. 4 could overlap, occur in parallel, occur in a different order, or occur multiple times. Moreover, some steps could be combined or removed and additional steps could be added according to particular needs.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for troubleshooting a field device in an energy distribution process, comprising:
   initiating a chat session between a first user of a mobile device in proximity to the field device and a second user remote from the field device, the field device associated with at least one metering device used in the energy distribution process;
   receiving, at the mobile device via the chat session, one or more commands for the field device from a computing device used by the second user;
   receiving, at the mobile device via the chat session, a request for the second user to be able to send the one or more commands to the field device;
   receiving, at the mobile device, approval from the first user to allow the second user to send the one or more commands to the field device;
   sending, from the mobile device to the field device, the one or more commands for execution by the field device;
   receiving, at the mobile device, information from the field device; and
   sending, from the mobile device to the computing device via the chat session, the information.

2. The method of claim 1, further comprising:
   communicatively coupling the mobile device to the field device using a short range communication technique.

3. The method of claim 1, wherein:
   receiving the one or more commands for execution by the field device further comprises receiving a command for the field device to enter a development mode.

4. The method of claim 1, further comprising:
   receiving, at the mobile device via the chat session, a request for parameter information of the field device;
   sending, from the mobile device to the field device, a request for the parameter information;
   receiving, at the mobile device from the field device, the parameter information; and
   sending, from the mobile device to the computing device via the chat session, the parameter information.

5. A mobile device for troubleshooting a field device in an energy distribution process, comprising:
   a communication unit include at least one network interface card or wireless transceiver configured to communicate with the field device when the mobile device is proximate to the field device, the field device associated with at least one metering device used in the energy distribution process; and
   at least one processing device configured to:
      initiate a chat session between a first user of the mobile device and a second user remote from the field device;
      receive, via the chat session, one or more commands for the field device from a computing device used by the second user;
      receiving, at the mobile device via the chat session, a request for the second user to be able to send the one or more commands to the field device;
      receiving, at the mobile device, approval from the first user to allow the second user to send the one or more commands to the field device;
      initiate transmission of the one or more commands to the field device for execution by the field device;
      receive information from the field device indicating results of the one or more commands; and
      initiate transmission of the information to the computing device via the chat session of the information indicating the results of the one or more commands.

6. The mobile device of claim 5, wherein the communication unit is configured to use a short range communication technique to communicate with the field device.

7. The mobile device of claim 5, wherein the at least one processing device is further configured to:
   receive, via the chat session from the computing device, a command for the field device to enter a development mode.

8. The mobile device of claim 5, wherein the at least one processing device is further configured to:
   receive, via the chat session, a request for parameter information of the field device;
   initiate transmission, from the mobile device to the field device, of a request for the parameter information;
   receive, from the field device, the parameter information; and
   initiate transmission, from the mobile device to the computing device, of the parameter information.

9. A method for troubleshooting a field device in an energy distribution process, comprising:
   receiving a request to create a chat session between a first user of a mobile device in proximity to the field device and a second user remote from the field device, the field device associated with at least one metering device used in the energy distribution process;
   sending, from a computing device used by the second user via the chat session, one or more messages from the second user to the mobile device;
   sending, from the computing device via the chat session, one or more commands for the field device to the mobile device;
   sending, from the computing device via the chat session, a request for the second user to be able to send the one or more commands to the field device;
   sending, from the computing device via the chat session, approval from the first user to allow the second user to send the one or more commands to the field device; and
   receiving, at the computing device via the chat session, information from the field device.

10. The method of claim 9, wherein:
    sending the one or more commands for the field device further comprises sending a command for the field device to enter a development mode.

11. The method of claim 9, further comprising:
sending, from the computing device via the chat session, a request for parameter information of the field device; and
receiving, from the mobile device, the parameter information.

12. The method of claim 11, further comprising:
determining, based on the parameter information, one or more commands for the field device.

13. An apparatus for troubleshooting a field device in an energy distribution process, comprising:
at least one processing device configured to:
receive a request to create a chat session between a first user of a mobile device in proximity to the field device and a second user remote from the field device, the field device associated with at least one metering device used in the energy distribution process;
initiate transmission of one or more messages from the second user to the mobile device via the chat session;
initiate transmission of one or more commands for the field device to the mobile device via the chat session; and
send, from the computing device via the chat session, a request for the second user to be able to send the one or more commands to the field device;
send, from the computing device, approval from the first user to allow the second user to send the one or more commands to the field device; and
receive information from the field device via the chat session.

14. The apparatus of claim 13, wherein the at least one processing device is further configured to:
initiate transmission to the mobile device, via the chat session, of a command for the field device to enter a development mode.

15. The apparatus of claim 13, wherein the at least one processing device is further configured to:
initiate transmission, to the mobile device via the chat session, of a request for parameter information of the field device; and
receive the parameter information of the field device from the mobile device via the chat session.

16. The apparatus of claim 15, wherein the at least one processing device is further configured to:
determine, based on the parameter information, one or more commands for the field device.

* * * * *